June 1, 1937.  L. H. MOOMAW  2,082,074
HIGH SPEED CAMERA
Filed May 16, 1935  5 Sheets-Sheet 1
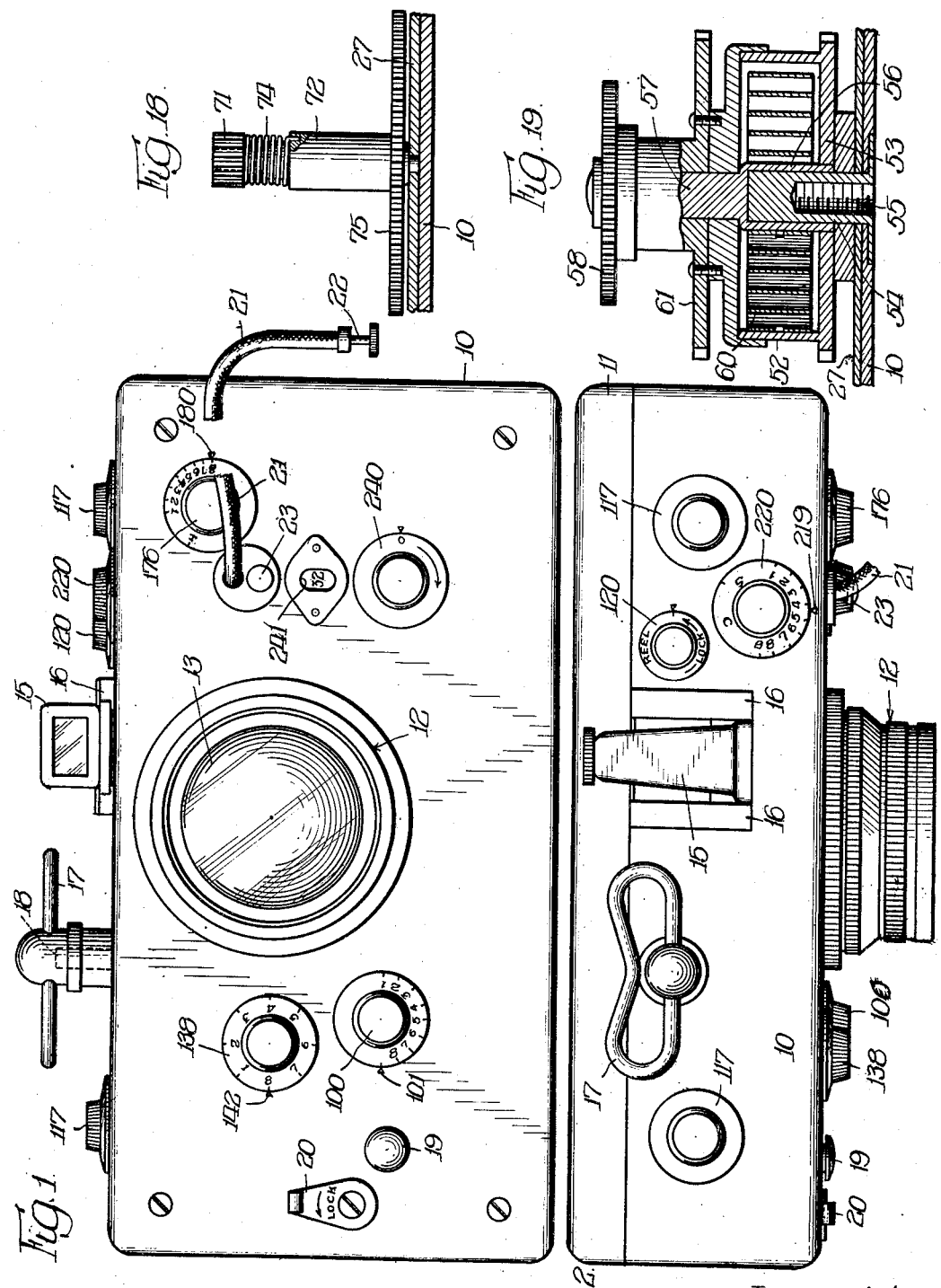
Inventor:
Lewis H. Moomaw

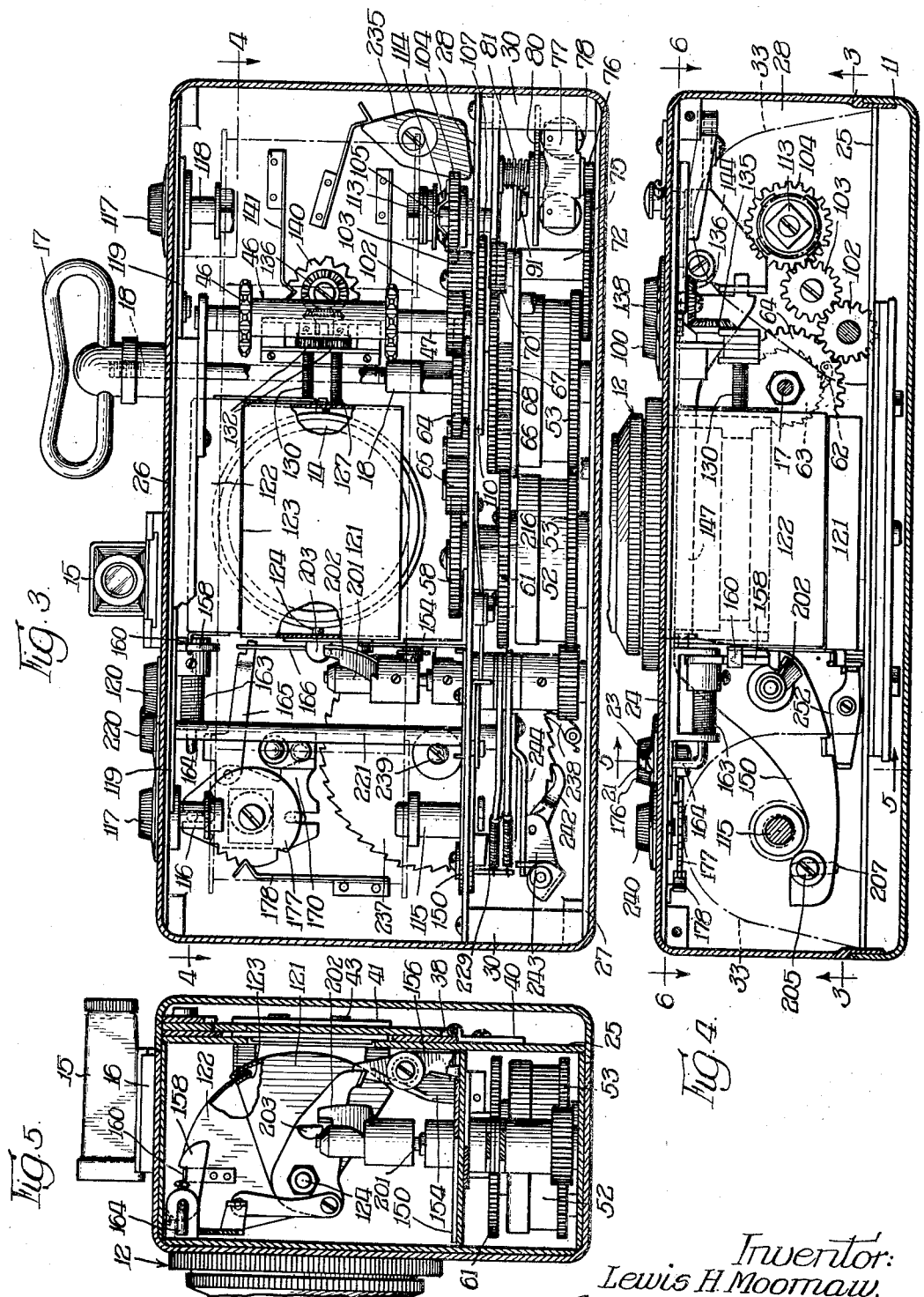

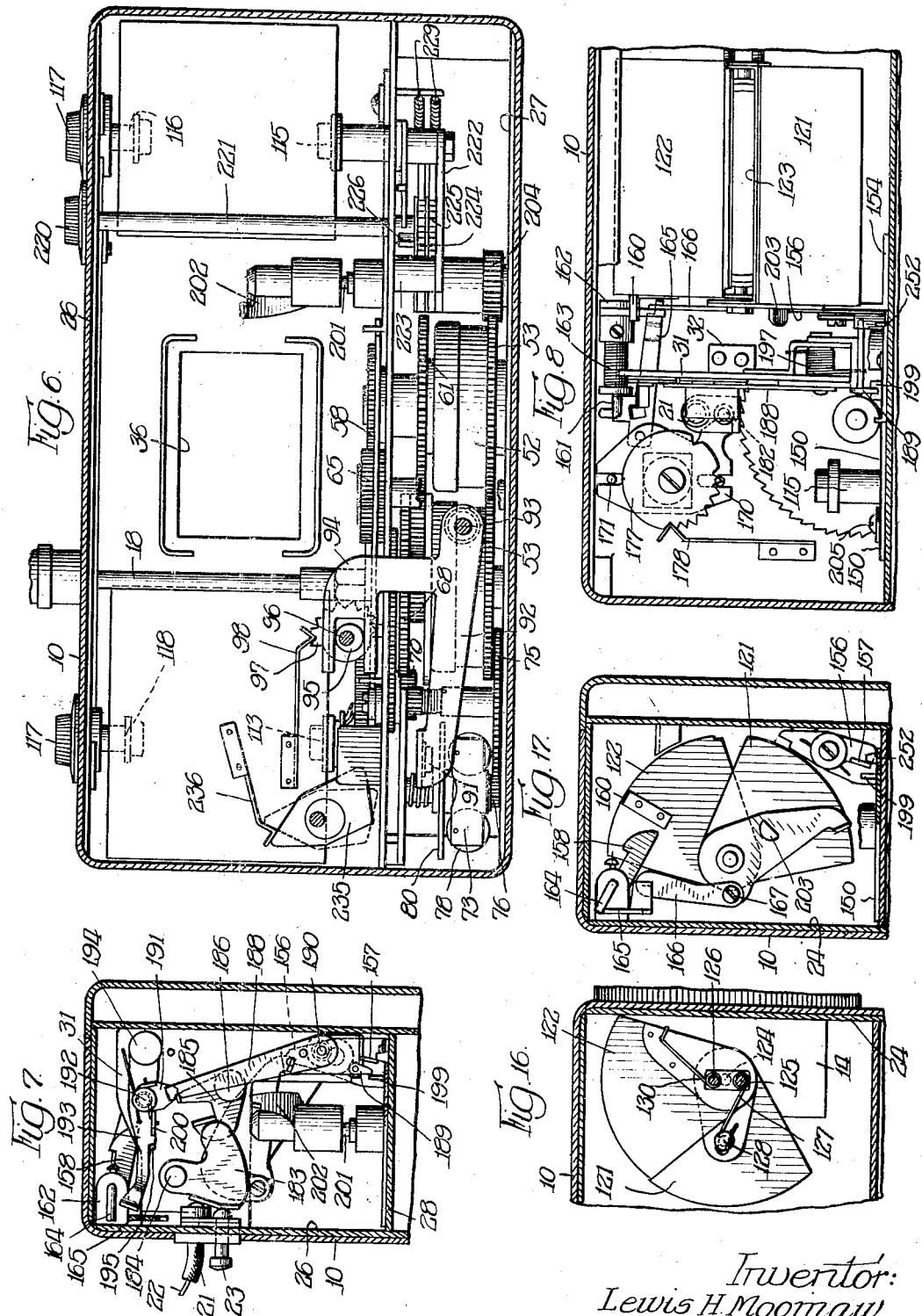

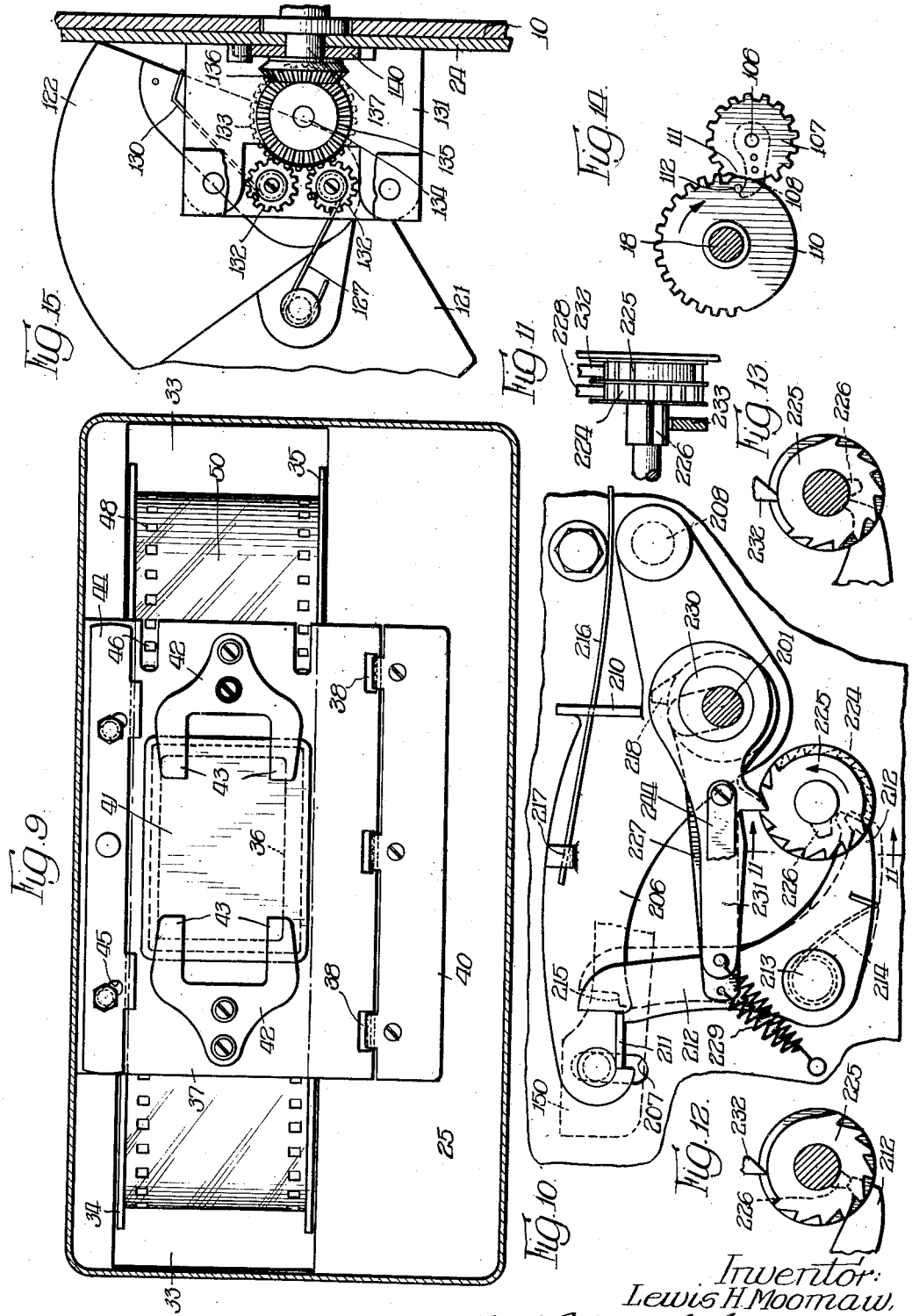

June 1, 1937.  L. H. MOOMAW  2,082,074
HIGH SPEED CAMERA
Filed May 16, 1935  5 Sheets-Sheet 5
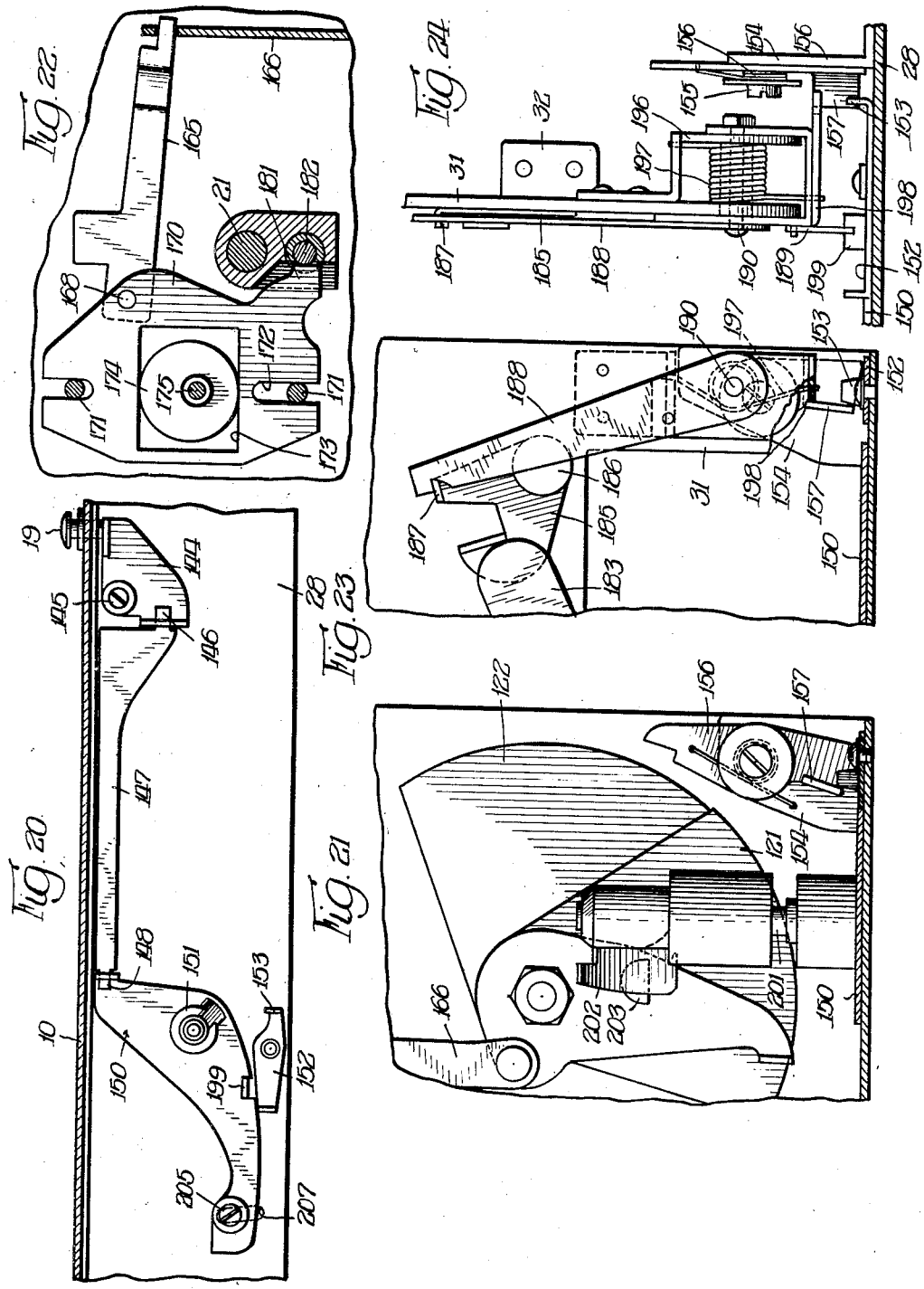
Inventor:
Lewis H. Moomaw Patented June 1, 1937

2,082,074

UNITED STATES PATENT OFFICE 2,082,074

HIGH SPEED CAMERA

Lewis H. Moomaw, Wilmette, Ill., assignor to Folmer Graflex Corporation, Rochester, N. Y., a corporation of Delaware Application May 16, 1935, Serial No. 21,775

17 Claims. (Cl. 88—17)

The present invention relates to cameras and has reference particularly to apparatus that will take consecutive exposures at a high rate of speed of moving objects or single exposures either instantaneously or timed according to the desire of the operator and which will be light in weight and compact, fulfilling all requirements of service and manufacture.

More specifically, the invention has for its object to provide a portable camera having a spring driven motor that will automatically take consecutive pictures on a film strip at intervals which may be predetermined within the range of the camera and which will also take single exposures either instantaneously for fast moving objects or timed exposures of still objects. The present camera incorporates novel means that can be set in advance for determining the number of successive exposures that will be taken and also provides an improved recording means for indicating to the operator the total number of pictures that have been exposed on the film spool within the camera. It is possible with the present camera to take the successive pictures automatically, which requires the operator to merely start the mechanism, or to take the pictures singly through bulb actuated means, thus permitting the operator to stand at a distance from the camera.

Another object is to provide a camera of the character described that will operate to draw the film strip past the exposure aperture intermittently in timed relation with the movement of the shutter, the film having movement when the shutter is being returned to a cocked or latched position. As previously stated, the camera is powered by a spring motor and another object of the invention resides in the provision of improved means for regulating the speed of said motor and which means can be adjusted to secure the particular speed desired. As the film moving mechanism and shutter returning means are driven from this motor the camera is capable of taking automatically a variable number of pictures in the same time interval and which in the embodiment disclosed in the drawings may vary from approximately fourteen pictures a second to one picture a second or even to one every three seconds.

Another object of the invention is to provide a camera for taking automatically a predetermined number of successive exposures and which can also be set to take single instantaneous exposures in rapid succession as the camera is automatically reloaded by the power mechanism, and is immediately ready for another single instantaneous exposure.

A further object is to provide novel shutter mechanism and improved means for tripping the shutter mechanism that will render possible a complete range of exposures from a high of one-two-thousandth of a second for very fast moving objects to the low ranges down to one-twenty-fifth of a second, and which tripping means also has operation for bulb or time exposures.

The shutter contemplated by the invention consists of two parts pivoted to move in an arcuate path and which are released independently, the interval elapsing between the tripping of the parts determining the extent of the gap therebetween or shutter aperture. Since the gap moves in an arc the structure approximates a true focal plane shutter.

A further object of the invention resides in the provision of a two part shutter as described, wherein the parts are powered by independent springs, the tension of which can be varied to change the speed of movement of said parts. This adjustment of the tension of the springs may be entirely separate and independent from the setting of the trip mechanism, controlling the extent of the gap, and therefore the present camera is capable of adjustments within a wide range to suit all possible conditions of light and speed of object being photographed.

Another object resides in the provision of a two-part shutter in which the shutter aperture is automatically closed on return movement and wherein the shutter aperture is of uniform width as the adjacent edges of the parts defining the aperture are held in perfect alignment by reason of the rigid construction of each part and the pivotal mounting of said parts.

A further object is to provide a shutter of novel type which will be extremely simple in construction, cheap to manufacture, although having improved operation and greater adjustability as to extent of gap and speed of movement. Another advantage of the present shutter resides in the ease with which the parts can be gripped and returned with the aperture closed to initial position in readiness for another exposure.

The apparatus of the invention is readily distinguished from cameras heretofore manufactured in the provision of shutter mechanism that can be adjusted as to exposure independently of the adjustment regulating the speed of the film through the camera and thus the rapidity of the successive exposures. With the present camera it is possible to set the shutter mechanism for an exposure of one-one-thousandth of a second in duration and to automatically take successive pictures which may be taken at a rate of fourteen a second or one a second, depending on the particular motor speed selected. The same number of pictures may be taken within the same time intervals with other adjustments of the shutter, for example, with an exposure of one-five-hundredths of a second duration or one-fifteen-hundredths of a second. The travel of the film through the camera determines the interval of time elapsing between exposures and since the regulation of the motor speed is separate from the means for setting the shutter mechanism, it will be seen that the time interval between exposures can be changed while maintaining the same setting of shutter aperture and speed. Therefore, it will be appreciated that the present camera has possibilities that are not present in cameras now on the market.

In the illustrated embodiment of the invention the spring motor is utilized to drive a train of meshing gears connecting with an improved speed regulating governor and a feed sprocket which is rotated intermittently for drawing the film past the exposure aperture. A friction clutch is provided in the drive to the governor, permitting the governor to rotate after the driving impulse thereto has ceased and another friction clutch is included in the drive to the film winding spool to allow for the progressive increase in the roll wound thereon. The gear train also drives a rotatable cam shaft positioned adjacent the shutter and having operation to return the shutter parts to initial latched position. When the mechanism is set for automatic operation the latch for the leading part of the shutter is held open and said leading part drops off of the cam shaft immediately after being returned to initial position. However, the shutter part which follows is held latched for an instant until tripped by movement of said leading shutter part.

Most of the improved features of the present camera are included in the objects and description enumerated above but many other advantages will no doubt appear to those skilled in the art from the following detailed description and drawings illustrating a preferred embodiment of the device.

In the drawings which illustrate an embodiment of the invention and wherein like reference characters are used to designate like parts—

Figure 1 is a front elevational view of the camera comprising the present invention;

Figure 2 is a top plan view of the camera shown in Figure 1;

Figure 3 is a sectional view showing in elevation the camera mechanism at rest and with the shutter in cocked position, and which view is taken in advance of the rear frame plate looking toward the front of the camera;

Figure 4 is a transverse sectional view taken substantially along line 4—4 of Figure 3;

Figure 5 is a sectional view taken along line 5—5 of Figure 4 and looking toward one end of the shutter mechanism;

Figure 6 is a vertical longitudinal sectional view taken substantially along line 6—6 of Figure 4 and looking toward the rear of the camera;

Figure 7 is a vertical transverse sectional view showing the shutter tripping mechanism for bulb and time actuation;

Figure 8 is a fragmentary vertical sectional view showing the association of the tripping mechanism of Figure 7 with other structure of the camera;

Figure 9 is an elevational view showing the film gate and film spools as they appear when viewed from the rear of the camera, the rear cover plate having been removed;

Figure 10 is an enlarged fragmentary detail view showing the mechanism for setting the camera for taking successive pictures automatically;

Figure 11 is a detail sectional view taken substantially along line 11—11 of Figure 10;

Figure 12 is a sectional view showing the position of the automatic mechanism when set for taking single exposures;

Figure 13 is a view similar to Figure 12 but showing the automatic mechanism set for continuous exposures;

Figure 14 is a detail sectional view showing the intermittent driving mechanism for the film feed sprocket and winding spool;

Figure 15 is a detail sectional view showing the means for regulating the tension of the springs actuating the parts of the shutter;

Figure 16 is another detail sectional view showing the shutter structure of the camera and the tension springs for actuating the same;

Figure 17 is a vertical transverse sectional view through the camera looking toward one end of the shutter mechanism and showing the position of the parts an instant after they have been released;

Figure 18 is an elevational view showing the friction drive interposed in the connections to the speed governor;

Figure 19 is a fragmentary sectional view taken through one of the housings for the spring motor and showing the shaft bored to provide a tripod attachment;

Figure 20 is a plan view of the manually release means for automatic operation of the camera;

Figure 21 is an elevational view showing the shutter mechanism and cam shaft for returning the shutter parts to initial latched position;

Figure 22 is a detail sectional view showing the structure for tripping the following part of the shutter and which determines the shutter aperture;

Figure 23 is an enlarged detail sectional view of certain parts of the mechanism for tripping the shutter mechanism by bulb or time actuated means; and Figure 24 is an enlarged detail view of the structure of Figure 23 looking toward the right.

In the embodiment of the invention selected for illustration in the drawings the camera is shown as housed within a casing comprising a main section 10 and a rear cover 11 which is removable from the main section to permit access to the spool retaining chambers and the film gate for loading the camera. The front of the casing is provided with a lens assembly 12 including a lens 13 and a lens barrel 14 which is used for pivotally supporting the parts of the shutter, as will be better understood as the description proceeds. The top of the camera casing is provided with a view finder 15 mounted for movement within the guides 16 and with a handle 17 suitably fixed to the stem 18 for manually winding the spring motor housed within the camera. Also located to the outside of the casing 10 of the camera are a plurality of knobs adapted to be rotated by the operator for setting the various camera mechanism, and which will be more particularly described in connection with the mechanism which they concern. The automatic operation of the camera is initiated by pressing the button 19 which may be locked against movement by the lever 20. For taking single instantaneous exposures the usual cord 21 encasing the movable rod 22 is provided, while for time operation of the camera the button 23 is actuated. This button is automatically locked against actuation when the camera is set to take pictures automatically.

The camera mechanism is located within a frame structure adapted to fit within the casing 10 and which comprises a frame plate 24 positioned against the front of the casing as shown in Figure 4, the rear plate 25 to which the film gate and spool retaining chambers are secured, as shown in Figure 9, top and bottom frame plates 26 and 27, respectively, Figure 3, a horizontal partition 28 secured in spaced relation to the bottom frame plate 27 by the studs 30, and a vertical partition 31, Figure 8, supporting the trip mechanism adapted to be actuated by the bulb means 22 or time button 23, and which partition is suitably secured to the front plate 26 by bracket 32.

As best shown in Figures 4, 5, and particularly Figure 9, the rear plate 25 is provided with a pair of cylindrically shaped members 33 closed on their top and bottom to form chambers for receiving the film spools 34 and 35, the former comprising the supply spool and having wound thereon a supply of film to be exposed while spool 35 is the take-up spool which is positively driven to wind the exposed film thereon. The rear plate is provided with an exposure aperture 36 located in direct alignment with the lens 13 of the lens assembly 12. A film gate 37 is pivoted at 38 to bracket 40 suitably secured to the rear plate 25 and when in locked position, as shown in Figure 9, the film gate positions a pressure pad 41 for covering the exposure aperture. The pad is held in an opening in the film gate by the flat springs 42 having bifurcated arms 43 overlying the pad. The latch 44 has angular movement by reason of the slots 45 and can be located in up position to release the film gate when it is desired to load the camera. The film feed sprocket 46, Figure 3, is rotatably supported by stud 47 and is positioned so as to protrude through openings in the rear plate and through the slots in the film gate, whereby the sprocket teeth engage in perforations 48 of the film strip 50. It will be understood as the description proceeds that the sprocket 46 is rotated intermittently and operates to draw the film 50 past the exposure aperture 36. The film is confined between the rear plate 25 and the film gate 37 and is held by the same in engagement with the feed sprocket.

Spring motor structure

The present camera, as previously described, is powered by a spring motor consisting of a pair of convolute springs housed within housings 51 and 52, Figure 3, the housings being connected together so that they rotate in unison by the meshing gears 53. Housing 51 is mounted for rotation on the stem 18, the convolute coil spring housed by the same being secured at its inner end to said stem 18 and at its other end to the housing. Housing 52 however is mounted to revolve on stud 54, Figure 19, which extends through the bottom plate 27 and casing 10, having a flanged portion flush with the casing. Said stud is thus firmly secured to the casing and is provided with a threaded bore 55 for receiving the end of a tripod support, whereby the camera may be fixed to said tripod. Rotating on the stud 54 is an arbor 56 having an upwardly extending portion 57 to which is suitably secured the gear 58. The inner end of a convolute spring 60 is fixed to the arbor and its outer end is secured to the housing 52. The housing is therefore caused to rotate by the energy stored in said convolute spring and this rotation is imparted to the gear 61 suitably secured to the housing.

Rotation of the stem 18 to wind the spring within the housing 51 is permitted by the pawls 62, Figure 4, which engage the ratchet 63. This rotation for winding the spring within the housing 51 is transmitted by gear 64 fixed to said housing 51, to the idler pinions 65, and then to the gear stem, 58, which, as shown in Figure 19, has connection with arbor 57 and therefore the spring within housing 52 is also wound. Rotation of the housings takes place in unison by reason of the meshing gears 53 and the driving impulse from housing 51 is transmitted through these gears to housing 52, whereupon the combined driving force of both housings is imparted to gear 61 which forms the beginning of the drive powered by said spring motors. The driving gear 61 meshes with pinion 66 which in turn drives pinion 67 having free rotation on the stem 18. Suitably fixed to this pinion is a large gear 68 which through meshing engagement with pinion 70, Figure 6, drives the pinion 71 mounted for rotation on shaft 72, Figure 18, included in the drive to the governor 73. Pinion 71 drives the shaft 72 through the friction clutch provided by the coil spring 74 and as this shaft provides a gear 75 having meshing engagement with pinion 76 fixed to the governor shaft, it will be seen that the governor is frictionally driven, the clutch permitting the governor to have rotation after the driving impulse thereto has stopped. In this manner the momentum of the governor is dissipated without placing an excessive strain on the gear drive and other operating parts.

Governor

The improved speed regulator used with the present camera is more particularly described in my co-pending application, Serial No. 691,438 filed September 29, 1933. The governor operates on the centrifugal principle and consists of frames 77 carrying at their outer end eccentrically mounted rollers 78 which are moved outwardly by centrifugal force upon rotation of the frames, whereupon they engage the circular disc 80 yieldingly held against the frames 77 by the coil spring 81. A stop 91 of any suitable friction material is adjustably positioned immediately above the circular disk 80 and is adapted to contact the disc when the same is moved axially on the governor shaft by reason of the outward movement of the rollers 78. Contact between the stop and disc 80 governs the speed of the camera mechanism and as this stop can be adjustably positioned with respect to the disc it will be understood that the governor and therefore the driving gears connecting therewith may have variable speeds.

As shown in Figure 6, the stop 91 is fixed to a portion provided by the lever 92 which is pivoted at 93 and has an upstanding member 94 integral therewith. This member is bifurcated at its end as shown for receiving the eccentric 95 on shaft 96, mounted for rotation in the frame plate 24 and casing 10 of the camera. Also fixed to this shaft is a notched disc 97 having a detent 98 engaging in the notches thereof and which holds the shaft in various rotated positions. On the end of the shaft 96 projecting through the casing 10 there is fixed a knob 100, Figure 1, having indicia thereon which when positioned opposite the marker 101 will locate the stop 91 to result in a certain speed for the camera driving mechanism.

*Film advancing and winding means*

As previously explained, the film is unwound from the supply spool 34, Figure 9, and is drawn past the exposure aperture 36 by an intermittent rotating sprocket 46, the teeth of which have engagement within perforations on the sides of the film, being subsequently wound upon spool 35. The sprocket 46 is secured to the shaft 47 which also has secured at its lower end the pinion 102 (Fig. 3). Said pinion meshes with a driving pinion 103 which in turn has association with a pinion 104 rotatably mounted on the upstanding stud shaft 105. The driving pinion 103 is fixed to shaft 106, Figure 14, which extends through the horizontal partition 28 and has the segmental pinion 107 fixed to the depending end thereof. Located on one side of said pinion and extending outwardly thereof is an arm 108. Associated with said segmental pinion is a complementary segmental gear 110 loosely mounted for rotation on the stem 18, but being fixed to and driven by gear 68. The segmental gear has teeth for a part of its circumference and is smooth surfaced for the remainder, and pinion 107 is likewise provided with teeth for a part of its circumference, having a smooth surfaced recess 111 between the teeth. When the pinion 107 and shaft 106 is at rest the parts may assume a position as shown in Figure 14, in which the smooth portion of gear 110 rides within the smooth surfaced recess 111. Said gear rotates clockwise and eventually the pin 112 carried by said gear will contact arm 108, rotating the pinion and throwing the teeth on the respective pinion and gear into mesh. Continued rotation of the gear will now rotate the pinion and this rotation is transmitted by pinion 103 to the sprocket shaft and to pinion 104. The stud shaft 105 rotatably mounts the driving member 113 which is adapted to connect with and rotate the take-up spool 35. Said driving member is rotated from the pinion 104 through a friction clutch 114 which permits slippage of the driving member to occur with respect to pinion 104.

Referring to Figures 3 and 4, it will be understood that the supply spool positioned within its chamber 33 is supported on the upstanding stud 115 and is held on said stud by the depending stud 116. This latter stud extends through an opening in plate 26 and has secured to its upper extending end a knob 117. In a like manner the take-up spool is supported on the driving member 113 as described and is held in engagement with said member by the depending stud 118, which likewise extends through openings in the upper plate and casing and receives a similar knob 117. When the spools are in place between their respective means the depending studs can be locked against upward movement by the metal strip 119 which is actuated by the knob 120. Although gear 110 has continuous rotation, pinion 107 is rotated once during every revolution thereof, comprising the intermittent drive to the sprocket 47 and member 113 connecting with the film take-up spool. These parts are therefore driven simultaneously and operate to draw the film past the exposure aperture and wind the same onto said spool.

*Shutter mechanism*

The shutter contemplated by the present invention consists of two parts, a lower or leading part 121, Figure 5, and an upper or following part 122. The adjacent edges of said parts have a tongue and groove interfitting relation as indicated by numeral 123 to prevent the passage of light therethrough when the shutter is being returned to cocked position. The tongue and groove connection is located above the exposure aperture when the shutter parts are in latched position and is located below the exposure aperture when the parts are in released position. Each of the camera parts have an arcuate periphery joined to end members, which in turn are pivoted to the laterally extending studs 124 fixed to the lens barrel 14. Each part of the shutter is therefore pivotally mounted and is adapted to have oscillating movement from a cocked position, as shown in Figure 5, to a tripped position, as shown in Figure 21.

Each shutter part connects with a coil spring, as shown in Figure 16, carried by shaft 125 and 126, positioned eccentrically with respect to the pivot shaft 124. The upper part connects with spring 127 through the pin 128 and the lower shutter part 121 has connection with the spring 130 which engages an edge of said shutter part. As best shown in Figure 15 the shafts 125 and 126 are journalled for rotation in spaced plates provided by bracket 131. The end of each coil spring is suitably fixed to its respective shaft and each shaft between said spaced plates has secured thereto a pinion 132 which in turn meshes with pinion 133 fixed to shaft 134 journalled by bracket 131 and which shaft also carries the bevel pinion 135. This gear meshes with a similar bevel pinion 136 carried by the stud shaft 137 which extends through an opening in the front plate and casing of the camera and has secured to its projecting end the knob 138, Figure 1. Also fixed to the shaft 137 is a toothed disc 140 having a detent 141 engaging the teeth thereof to hold the stud shaft in the desired rotated position. The knob 138 has indicia thereon and when said knob is rotated it will be understood that the rotations are transmitted through the bevel pinions and pinions 132 to eventually cause rotation of the respective shafts 125 and 126. When said shafts are rotated in one direction the springs are wound, increasing the tension of the same, which will have the result of increasing the speed of movement of the shutter parts when released. However, when the shafts are rotated in the direction to unwind the springs the speed of movement of the shutter parts will be proportionately lessened. As the shafts are rotated in unison the tension of each spring is varied an equal amount. Therefore, when said springs are once adjusted for their particular shutter parts, further adjustment is very seldom necessary. The indicia on knob 138 relates to particular shutter speeds and when located opposite the marker 142 the shutter speed selected will result.

*Shutter trip mechanism*

When it is desired to start the camera for taking automatically a number of exposures in rapid succession the button 19 is pressed, Figure 20, which results in rocking the plate 144, pivoted at 145 to the partition 28. This plate has a loose connection at 146 with an elongated member 147 also having a similar loose connection at 148 with a lever 150 supported on the partition 28 and having pivotal movement on the vertical cam shaft 151. This lever contacts pivot arm 152, having an upstanding portion 153 located adjacent a bracket 154, Figures 3 and 24. Pivoted to this bracket by means of the screw 155 is a latch 158 for latching the leading part 121 of the shutter. The latch is yieldingly urged into latching engagement by the coil spring 156 encircling the latch pivot screw and fixed at one end to the latch and at its other end to the supporting bracket. The portion 153 of the pivoted arm is adapted to contact a bent flange 157 projecting outwardly from the base of the latch and when the same is forced into contact therewith by movement of the arm 152, caused by oscillation of lever 150, the latch is rocked against the tension of the coil spring 156 in a direction to release the leading shutter part.

The upper or following shutter part is held by latch 158 which engages with a member 160 fixed to said part. Said latch, as shown in Figures 8 and 17, is fixed to a rod 161 mounted for rotation in brackets 162. A coil spring 163 encircles said rod between the brackets and operates to maintain the rod so as to position the latch 158 upwardly, where it will engage member 160 and hold the shutter part 122 against downward movement. The rod at its free end is bent, providing a tripping portion 164 by which the rod is oscillated to release the latch from its engagement with said shutter part. The portion 164 for releasing the latch 158 is adapted to be tripped by the lever 165, which, as shown in Figures 3 and 17, has a bent portion loosely connecting with the link 166 pivoted at 167 to the leading shutter part 121. When said shutter part moves downwardly the link 166 is given an upward movement, causing lever 165 to move upwardly until the same engages the portion 164, rocking the rod 161 and releasing the upper shutter part.

The invention provides means for varying the position of the pivot end of lever 165 to change the degree of movement of the lever required to trip the latch 158. In other words, the invention provides adjustable means that can be set by the operator to vary the interval of time elapsing between the release of the leading part 121 of the shutter and tripping of the upper part 122. As shown in Figures 3 and 22 the lever 165 is pivoted at 168 to a slotted plate 170 supported for vertical movement by the pins 171 which ride within the slots 172. The plate is also formed with a rectangular opening 173 for receiving the eccentric 174 secured to shaft 175 extending through openings in the front plate 24 and the casing 10 of the camera. The outwardly extending end of said shaft has the knob 176, Figure 1, secured thereto and adapted to be rotated by the operator, to turn the eccentric 174 and move the plate 170 on the pins 171. This movement of the plate varies the position of the pivoted end of the lever 165 and therefore the tripping of the upper shutter part can be caused to occur at different intervals with respect to the release of the lower part. Also fixed to shaft 175 is a notched disc 177 having a detent 178 engaging the notches thereof and which holds the shaft in various rotated positions.

The knob 176 is provided with various numerical indicia and with the letter "T". When the knob is rotated to locate a certain numeral opposite the marker 180 the lever 165 will be set to cause tripping of the upper shutter part at a definite time interval. This results in a gap between said shutter parts of the desired extent and which gap is of uniform width as the shutter parts travel downwardly until they eventually interfit after full movement has occurred. The shutter structure and tripping means is capable of producing a gap or shutter aperture of approximately one-sixty-fourth of an inch in width up to a maximum shutter aperture, which results when the upper part is tripped the instant the lower part has assumed a full released position. When the knob is turned to locate the letter "T" opposite the marker the mechanism will be set for time actuation. This locates the plate 170 in its extreme lowermost position where the projecting portion 181, Figure 22, will be located out of locking engagement with the stud shaft 182, thus releasing the shaft for movement. This lowermost position of the plate also locates the lever 165 in an extremely low position where full movement of the link 166 will not result in tripping of latch 158. The stud shaft 182 has the button 23, Figure 1, fixed to its projecting end and movement of the button inwardly and outwardly will actuate other tripping mechanism to be presently described, whereby a timed exposure is secured.

As best shown in Figure 7 pressing of the button 23 inward will rock the L-shaped arm 183, pivoted to partition 31 at 184. Said arm contacts with a second arm 185 of somewhat similar shape, pivoted to the partition at 186. Said latter arm 185 has a portion 187 fitting within a notch formed in the lever 188 pivoted at its lower end by the pin 190, Figures 23 and 24. Portion 187 is also adapted to engage a pawl 191 pivoted at 192 to the trip lever 193, which is pivotally secured at 194 to the partition 31 and spring pressed into contact with the stop 195. It will be noted that the end of lever 193 is directed upwardly and positioned immediately below the trip portion 164 for releasing the latch 158. When said arm is rocked upwardly it will be caused to contact portion 164, resulting in tripping the latch.

Referring again to lever 188 it will be observed by reference to Figure 24 that the pivot pin 190 passes through said partition and extends through a bracket 196 spaced on the opposite side of said partition. A coil spring 197 encircles the pin and is confined between the partition and bracket, being secured at one end to the bracket and connecting at its other end with an L-shaped member 198 which forms a continuation of the lever 188. This spring urges the lever into contact with arm 185. The horizontal portion of the member 198 extends into the path of the bent flange 157 of the latch 156.

The operation of the tripping mechanism for a time exposure is as follows:

The arm 183 is rocked when the button 23 is pressed inward, which rocking movement is imparted to arm 185 and to the lever 188, oscillating the said lever clockwise against the tension of the spring 197, Figure 23. This movement of the lever will bring member 198 into engagement with the bent flange of the latch 158, forcing the latch into released position, thus freeing the leading shutter part. The shutter remains open as long as the button 23 is held in. When released, the tension exerted by spring 197 on the lever 188 will rock the lever counterclockwise and will bring portion 187 into contact with the pawl 191. It will be observed that initial movement of the lever 188 merely rotated this pawl to allow the portion to pass beyond the same, but movement of the portion in an opposite direction will bring the pawl into contact with shoulder 200 projecting outwardly from the lever 193 and as a result the lever 193 is given an upward movement to engage the tripping portion 164, thereby tripping the latch 158 and releasing the upper shutter part. These two actuations of the button 23 therefore completes an exposure which may be timed as to duration by the operator.

The mechanism described can also be actuated by the bulb means 22 which is always operative, and when actuated with the various settings of the knob 176 other than "T" instantaneous exposures will result.

It is possible to repeat the instantaneous or timed exposures in rapid order as the camera is automatically reloaded. This reloading of the camera requires actuation of the lever 150 (Fig. 20) to start the motor mechanism through the series of levers shown in Figure 10, to be presently described.

Pivoted to the member 198 is a pawl 189 having pivotal movement so as to ride over the upstanding portion 199 when said member and lever 188 are oscillated to cause tripping of latch 156 and release of the leading shutter part. The upstanding portion 199 is a part of lever 150 and thus this lever is not moved in this instance by the pawl. However, when the lever 188 is returned the pawl 189 engages a stop and its pivotal movement is restricted with the result that the motion of the pawl is transmitted to the portion 199 and lever 150 is actuated. This actuation of lever 150 releases the motor mechanism and the camera is reloaded as described. The motor mechanism is automatically stopped when this is accomplished and can be started again only by another actuation of lever 150 as described.

Shutter return mechanism

Journalled by the base plate 27 and partition 28 and extending a distance above the partition is a vertical cam shaft 201 having a cam 202 fixed to the upper end thereof which is adapted to contact the rounded side of the projection 203 extending outward from the lower shutter part 121 for returning the shutter parts to their initial latched position. It will be noted that the cam 202 has a steep inclined formation and as the cam revolves contact of the same with the projection 203, Figure 21, at the base of the cam will result. Further rotation of the cam shaft will force the projection and thus the shutter parts in an upward direction. Very little force is required to return or cock the shutter parts as the cam engages the projection on the side adjacent the pivot of the shutter parts and moves outwardly, and further, the time required to cock the shutter mechanism is very short as the cam has a steep incline. Secured to the base of the cam shaft 201 is a pinion 204 meshing with gear 53 provided by the spring housing 52. The spring motors therefore drive the cam shaft and also the film sprocket and the take-up spool.

Automatic operation

When the button 19 is pressed to oscillate the lever 150 which rocks the pivot arm 152, tripping the shutter mechanism, operation of the spring motors and driving gears are started by this movement of the lever 150 through the connection 205 which said lever has with a release lever 206, Figure 10. The connection in the form of a depending stud extends through an arcuate slot 207 in the partition 28 and suitably joins with the release lever which is pivoted at 208 to the underside of said partition. Said lever is provided with a stop shoulder 210 and a portion 211 bent therefrom and extending into the path of a bell crank 212 pivoted to the underside of the partition at 213 and urged by the spring 214 into contact with said portion. The release lever is also yieldingly biased in a direction toward the cam shaft 201, Figure 10, by the spring wire 216 which is fixed at 217 to the lever and at its other end to the partition. Rotating with the cam shaft is a projection 218 which is adapted to contact the stop 210. It will be observed that the projection is rotated by the cam shaft counterclockwise and that the cam shaft is in this manner held against rotation since the stop 210 will be normally urged into the path of said projection. Tripping of the shutter will oscillate the release lever to withdraw the stop 210 out of the path of the projection 218, starting operation of the spring motors and connecting gearing, whereupon the cam shaft is driven and also the film feeding means and the driving member 113 for rotating the take-up spool. The structure above described is designed to first trip the shutter and as lever 150 continues to pivot, the additional movement will oscillate the release lever 206 sufficiently to release the cam shaft, starting operation of the motors as described.

The invention contemplates the provision of means that can be set by the operator in advance and which will determine the number of successive exposures to be taken by the camera in rapid order. In the present embodiment the camera will take a maximum of nine consecutive exposures but it is to be understood that this number may be increased without departing from fundamental principles. The selector is in the form of a knob 220, Figure 2, having numerals thereon up to "9" and also have the letters "S" and "C". This knob is fixed to a shaft 221 which extends through the top plate of the frame structure through the partition, Figure 6, and has its depending end journalled in a bracket 222 supported by the studs 223. Fixed to this shaft immediately above the bracket are a pair of ratchet members 224 and 225, respectively, and a hub which carries a projection 226. The cam shaft 201, as best shown in Figure 10, journals a detent arm 227 having a pawl 228 engaging the ratchet teeth of the member 224 and being held in contact therewith by the spring 229. The cam shaft has eccentric 230 fixed thereto adjacent the detent arm and which eccentric actuates an arm 231 having a pawl 232 for association with the ratchet member 225. This ratchet member, as shown in Figures 11, 12 and 13, has teeth for only a part of its periphery, the space therebetween being smooth and of arcuate shape. The bell crank 212 has a shoulder 215 formed on one end for engaging with portion 211 and has a finger 233 on its other end for association with the projection 226.

When the knob 220 is set for taking a number of automatic exposures in succession, as for example two, the shaft 221 and ratchet members will have been rotated to locate pawl 232 in the second notch, as shown in Figure 10. When the camera is tripped, as described, release lever 206 will be oscillated, withdrawing the stop from out of the path of the projection 218, whereupon the motor mechanism will start. The rotation given the cam shaft 201 will actuate the arm 231 and pawl 232 will be moved forwardly and then rearwardly to rotate the ratchet member 225 one notch. The detent arm is provided merely to prevent reversed rotation of the ratchet members. Referring again to movement of the release lever 206, it will be seen that motion of the same will bring portion 211 in alignment with the shoulder 215 of the bell crank 212 and as said bell crank is urged by spring 214 against the portion, the shoulder will engage the same, holding the release lever 206 in released position. The motor mechanism is therefore free to continue operation but for every revolution of the cam shaft the pawl 232 will rotate the ratchet members one notch, which will bring the projection 226 eventually into contact with the finger 233 of the bell crank. When engagement between these parts does take place the bell crank will be rocked in a clockwise direction, Figure 10, to free the portion 211, permitting the release lever 206 to move into locking position with the cam shaft.

At the end of the automatic operation above described the projection 226 will be in engagement with the finger 233, holding the bell crank out of latching position with portion 211 of the release lever. This position of the parts is shown in Figure 12, and the knob will be set at "S" for single exposures. Now when the button 19 is pressed the lever 150 will be rocked, causing tripping of the shutter mechanism and movement of the release lever as above described, but latching will not take place and the lever will immediately move back to its initial locking position so that the cam shaft will rotate but one revolution. During this one revolution, however, the spring motor will drive the film feeding mechanism and the take-up spool through the train of gears previously described so that at the end of the rotation of the cam shaft the exposed film will have been drawn past the exposure aperture, wound on the take-up spool and an unexposed portion will be positioned opposite the exposure aperture. Also the cam 202 will have cocked or returned the shutter mechanism to latched position.

When the knob 220 is rotated to locate the letter "C" opposite the marker 219 the ratchet members will assume the position as shown in Figure 13, wherein the pawl 232 rides on the smooth arcuate portion of its ratchet member and with the projection 226 out of engagement with the finger 233. The camera will now operate continuously to take successive exposures.

The camera is adapted to use sensitized film in strip form having perforations along the edges, which is drawn past the exposure aperture 26 in the direction of the length of said aperture. It is possible to remove the bulb actuated means including the cord 21 encasing the wire rod 22 but even with this removed the camera is capable of automatic operation through actuation of button 19, while single instantaneous exposures or timed exposures can be taken through actuation of button 23. Normally this button is locked against actuation and movement of the same can only be effected when the knob 176 is set for time with the letter "T" opposite the marker 180. It is also possible to lock button 19 against actuation by the lock 20 which locates plate 235 in either locked or released position, said plate being held by detent 236, Figure 6.

The camera also includes a counter which indicates to the operator the total number of exposures taken on the particular film spool within the camera. This is shown in Figure 3 and consists of a toothed disc 237 of large diameter, held in rotated position by the pawl 238 and fixed to shaft 239 having the knob 240 for initially setting the disc. The numbers on the disc are visible through the window 241. The toothed disc is actuated by the pawl 242 pivotally connecting with the member 243 adapted to be oscillated for each rotation of the cam shaft by the arm 244 having connection with the arm 231.

The shutter parts are preferably constructed of thin sheet metal and supported for pivotal movement by studs extending laterally from the lens mount which is threaded internally for receiving the lens of the camera. However, it is within the invention to pivotally mount the shutter parts to other frame structure of the camera. The metal shutter parts have maximum rigidity which insures a gap or aperture of uniform width and their construction also renders it possible to return the shutter parts to initial position by cam means engaging with the lower shutter part only, as movement of this part carries the upper shutter part with it. During this return movement the parts have interfitting relation so that it is not possible to accidentally expose the sensitized film during cocking of the shutter. When the camera mechanism is operating automatically to take successive exposures, which may be predetermined by setting of the knob 220, it will be understood that the release lever 206 and latch 156 will be held in inoperative position. Thus the latch 156 remains out of association with the leading shutter part during automatic operation and the shutter part is in effect tripped or released by the cam 202. Immediately as the shutter parts are cocked by movement of this cam the leading part drops off of the high point of the cam to effect another exposure. It is possible to press the button 19 in for substantially half of its movement to trip the shutter mechanism, which, however, will not be sufficient to release the motor mechanism to reload the camera. Therefore, a picture can be taken without the disturbing noise incident to the reloading of the camera, which operation can be accomplished at some later time.

A fundamental principle of the camera resides in the independence of the shutter mechanism and the means regulating the speed of the film through the camera. The shutter can be set for a particular speed and for any shutter aperture desired, while adjustment of the governor is entirely separate and apart therefrom. It is possible with the present camera to position the stop for the governor to obtain the lowest possible speed for the spring powered driving mechanism and to vary the setting of the shutter to suit the particular object being photographed. This might call for an exposure of one-one-thousandth of a second duration or one-twenty-fifth of a second. While maintaining the same shutter speed and aperture the speed of the driving mechanism can be changed to a maximum or any speed between the high and low can be selected. This has the effect of varying the rapidity of the successive exposures and which is possible without disturbing the particular setting for the shutter mechanism.

What is claimed is:

1. In a camera, in combination, motor means, a shutter positioned in alignment with an exposure aperture, said shutter being actuated from a latched to a released position by spring tension, means for varying said spring tension to vary the speed of movement of said shutter, shutter return means, means for operating the shutter return means from said motor means, film feeding means operated by said motor means for drawing film past said aperture, and means for regulating the speed of said film feeding means independently of the adjustment of said spring tension for the shutter.

2. In a camera, a casing housing feeding means for advancing a sensitized film intermittently past an aperture, a shutter pivotally supported within said casing and including a leading part and following part, independent springs tensioning each part for effecting movement of the same, separate latching means for each shutter part, means for releasing the leading shutter part, means actuated by the leading shutter part for releasing the following part of the shutter, setting mechanism whereby the interval of time between the release of the leading and following shutter parts may be varied, means returning the shutter parts to initial position after release, and motor mechanism having variable speed for driving the film feeding means and shutter return means.

3. A camera having in combination, feeding means for advancing a sensitized film intermittently past an exposure aperture, a shutter including a leading and following part adapted to have pivotal movement, means for returning the shutter parts to latched position, and spring motor mechanism for driving the film feeding means and the shutter return means.

4. A camera having in combination, feeding means for advancing a sensitized film intermittently past an exposure aperture, a two-part shutter, means mounting the parts for pivotal movement, independent adjustable springs tensioning each shutter part for effecting movement thereof when released, cam means for returning the shutter parts to latched position, and spring powered mechanism for driving the film feeding means and shutter return means, film feeding means being regulable in speed independent of the adjustment of said springs.

5. A camera having in combination, feeding means for advancing a sensitized film intermittently past an exposure aperture, a two-part shutter, means mounting the parts for pivotal movement, rotatable cam means adapted to engage one part of said shutter for returning both parts to a latched position, spring powered mechanism for driving the film feeding means and cam means, and means to vary the action of the shutter return means from said spring powered mechanism.

6. A camera having in combination, feeding means for advancing a sensitized film intermittently past an exposure aperture, a shutter adapted to have movement from a latched to a released position when said film remains at rest, means for returning the shutter to a latched position after release thereof, a motor mounted within the camera for driving the film feeding means and shutter return means, means whereby the shutter may be set for a particular speed and aperture independent of said motor, a release lever for controlling the operation of said source of power, and setting mechanism operative to hold the release lever to permit a predetermined number of successive exposures.

7. A camera having in combination, feeding means for advancing a sensitized film intermittently past an exposure aperture, a shutter including a leading and following part mounted for pivotal movement, independent springs tensioning each part for effecting movement when released, means for returning the shutter parts to initial position, a motor for driving the film feeding means and said shutter return means, a release lever for controlling the operation of said motor, and setting mechanism operative to hold the release lever to permit a predetermined number of successive exposures.

8. A camera having in combination, feeding means for advancing a sensitized film intermittently past an exposure aperture, a shutter including a leading and following part mounted for pivotal movement, independent springs tensioning each part for effecting movement when released, a latch for the leading shutter part, a latch for the following part adapted to be tripped by movement of the leading part from an operative position, manual means for releasing the latch for the leading part, means for returning the shutter parts to initial position, and a motor for driving the film feeding means and shutter return means.

9. A camera having in combination, feeding means for advancing a sensitized film intermittently past an exposure aperture, a shutter including a leading and following part mounted for pivotal movement, independent springs tensioning each part for effecting movement when released, a latch for the leading shutter part, a latch for the following part adapted to be tripped by movement of the leading part from an operative position, manual means for releasing the latch for the leading part, means for returning the shutter parts to initial position, a motor for driving the film feeding means and shutter return means, and a lever for controlling the operation of said motor, said manual means upon actuation successively releasing the leading shutter part and said lever.

10. A camera having in combination, feeding means for advancing a sensitized film intermittently past an exposure aperture, a shutter including a leading and following part mounted for pivotal movement, independent springs tensioning each part for effecting movement when released, a latch for the leading shutter part, a latch for the following part adapted to be tripped by movement of the leading part from an operative position, means for returning the shutter parts to initial position, a motor for driving the film feeding means and shutter return means, a lever for controlling the operation of said motor, manually actuated means for successively releasing the latch for the leading shutter part and said lever, and setting mechanism operative to hold the latch and lever to permit a predetermined number of successive exposures.

11. A camera having in combination, feeding means for advancing a sensitized film intermittently past an exposure aperture, a motor for driving said film feeding means, a shutter having movement from a latched to a released position for exposing said film, means independent of said motor for effecting said movement of the shutter, shutter return means driven by said motor, and means for successively releasing the shutter and initiating operation of the motor.

12. A camera having in combination, feeding means for advancing a sensitized film intermittently past an exposure aperture, a motor for driving said film feeding means, a shutter having movement from a latched to a released position for exposing said film, means independent of said motor for effecting said movement of the shutter, a latch for holding the shutter in operative position, shutter return means driven by said motor, a release lever for controlling the starting and stopping of said motor, and setting mechanism operative to hold the latch and lever in release position until a predetermined number of exposures have occurred, whereby said shutter is returned simultaneously with the movement of the film and is released by the shutter return means to effect another exposure.

13. In a camera adapted to receive a film and provided with means for driving said film, a shutter positioned in alignment with an exposure aperture, said shutter having a leading part and a following part, means for releasing said shutter parts, shutter return means, motor mechanism for driving the film feeding means and the shutter returning means, and means for varying from said motor mechanism the action of the shutter return means.

14. In a camera adapted to receive a continuous film strip and provided with means for feeding and rolling said film strip, a shutter adapted to have movement from a latched to a released position while the said film is at rest, means to return the shutter to latched position, a source of power carried by the camera for driving the film feeding means and shutter return means, and means to permit a predetermined number of successive instantaneous exposures.

15. In a camera adapted to receive a continuous film strip and provided with means for feeding said film strip, a shutter consisting of a leading part and a following part, and adapted to have movement from a latched to a released position for exposing the film, means independent of the driving means for the film feeding means for effecting movement of the shutter, and shutter return means driven by the means for feeding the film.

16. In a camera adapted to receive a continuous film strip and provided with motor means for feeding said film, a two-part shutter, independent springs to actuate the same, and means for tensioning said springs independently of each other, so as to permit change in the relative speed of said shutter parts, and shutter return means driven by the means for feeding the film.

17. In a camera adapted to receive a film and provided with motor means for feeding said film, a shutter mechanism having shutter return means, means carried by the camera for regulating the speed of the film through the camera, means to vary the action of the shutter return means from the motor means, and means whereby the shutter may be set for a particular speed and for any shutter aperture desired without affecting the film speed.

LEWIS H. MOOMAW.